United States Patent [19]

Chigier

[11] Patent Number: 5,638,487
[45] Date of Patent: Jun. 10, 1997

[54] AUTOMATIC SPEECH RECOGNITION

[75] Inventor: Benjamin Chigier, Brookline, Mass.

[73] Assignee: PureSpeech, Inc., Cambridge, Mass.

[21] Appl. No.: 366,682

[22] Filed: Dec. 30, 1994

[51] Int. Cl.[6] .................................................. G10L 9/00
[52] U.S. Cl. .................. 395/2.62; 395/2.57; 395/2.11; 395/2.41
[58] Field of Search ............................. 395/2.62, 2.54, 395/2, 2.43, 2.57, 2.11, 2.41; 381/41, 43, 42

[56] References Cited

U.S. PATENT DOCUMENTS

| | | | |
|---|---|---|---|
| 3,943,295 | 3/1976 | Martin et al. | 395/2.62 |
| 4,349,700 | 9/1982 | Pirz et al. | 395/2.62 |
| 4,665,548 | 5/1987 | Kahn | 381/43 |
| 4,783,803 | 11/1988 | Baker et al. | 381/42 |
| 4,803,729 | 2/1989 | Baker | 381/43 |
| 4,821,325 | 4/1989 | Martin et al. | 381/46 |
| 4,945,566 | 7/1990 | Mergel et al. | 381/41 |
| 5,285,522 | 2/1994 | Mueller | 395/2.41 |
| 5,305,422 | 4/1994 | Junqua | 395/2.62 |
| 5,479,563 | 12/1995 | Yamaguchi | 395/2.41 |

OTHER PUBLICATIONS

Cole et al.("Speaker-Independent Recognition of spoken english letters", Neural Networks, 1990 International Conference, Jan. 1990, vol. 11, pp. 45-51).

Farrell et al.,(Speaker recognition using neural networks and conventional classifiers", IEEE transactions on Speech and Audio Processing, Jan. 1994, vol. 11, pp. 194-205).

Leung et al., "A Comparative Study of Signal Representations and Classification Techniques for Speech Recognition", 1993 IEEE, pp. 680-683.

Benjamin Chigier, "Phonetic Classification on Wide-Band and Telephone Quality Speech", 1992.

Chigier et al., "The Effects of Signal Representations, Phonetic Classification Techniques, and the Telephone Network", ICSLP 1992.

Pitrelli et al., "Multiple-Level Evaluation of Speech Recognition Systems", ICSLP 1992.

Chigier et al., "Are Laboratory Databases Appropriate for Training and Testing Telephone Speech Recognizers?", ICSLP, 1990, pp. 1017-1020.

Chigier et al., "Broad Class Network Generation Using a Combination of Rules and Statistics for Speaker Independent Continuous Speech", 1988 IEEE, pp. 449-452.

Cole et al., "The C-MU Phonetic Classification System", 1986 IEEE, pp. 2255-2257.

Thomas et al., "The Sensitivity of Speech Recognisers to Speaker Variability and Speaker Variation (Before Dec. 1993).

Chigier et al., "Analysis of Two Algorithms for Telephone Speech Recognition" (Before Dec. 1993).

Digalakis et al., "Fast Algorithms for Phone Classification and Recognition Using Segment-Based Models"(Before Dec. 1993).

Chigier, "Phonetic Classification on Wide-Band and Telephone Quality Speech," Proceedings 5th Workshop, presented at Arden House, NY, 1992.

Mandelbaum, "SPEECH: Just say the word," IEEE Spectrum, 30, Feb. 1994.

Hammerstrom, "Working with neural networks," IEEE Spectrum, 46-53, Jul. 1993.

(List continued on next page.)

Primary Examiner—Allen R. MacDonald
Assistant Examiner—Vijay B. Chawan
Attorney, Agent, or Firm—Fish & Richardson P.C.

[57] ABSTRACT

A scheme for recognizing speech represented by a sequence of frames of acoustic events separated by boundaries, according to which the frames of speech are processed to assign to received frames respective boundary probabilities representative of the degree to which the frames of speech correspond to stored representations of boundaries between acoustic events. The assigned boundary probabilities are used in subsequent processing steps to enhance recognition of speech. The assignment of boundary probabilities and further adjustments of the assigned probabilities are preferably conducted by an artificial neural network (ANN).

34 Claims, 10 Drawing Sheets

OTHER PUBLICATIONS

Hammerstrom, "Neural networks at work," IEEE Spectrum, 26-32, Jun. 1993.

Lippmann, "An Introduction to Computing with Neural Nets," IEEE ASSP 4:4-22, 1987.

Hush et al., "Progress in Supervised Neural Networks," IEEE Signal Processing 8-39, Jan. 1993.

Waibel et al., "Phoneme Recognition Using Time-Delay Neural Networks," IEEE Transactions on Acoustics, Speech, and Signal Processing 37:328-339, 1989.

Tank et al., "Neural computation by concentrating information in time," Proc. Natl Acad. Sci. USA 84:1896-1900, 1987.

Levin, "Word Recognition Using Hidden Control Neural Architecture," ICASSP 90 Proceedings, 1:433-436, 1990.

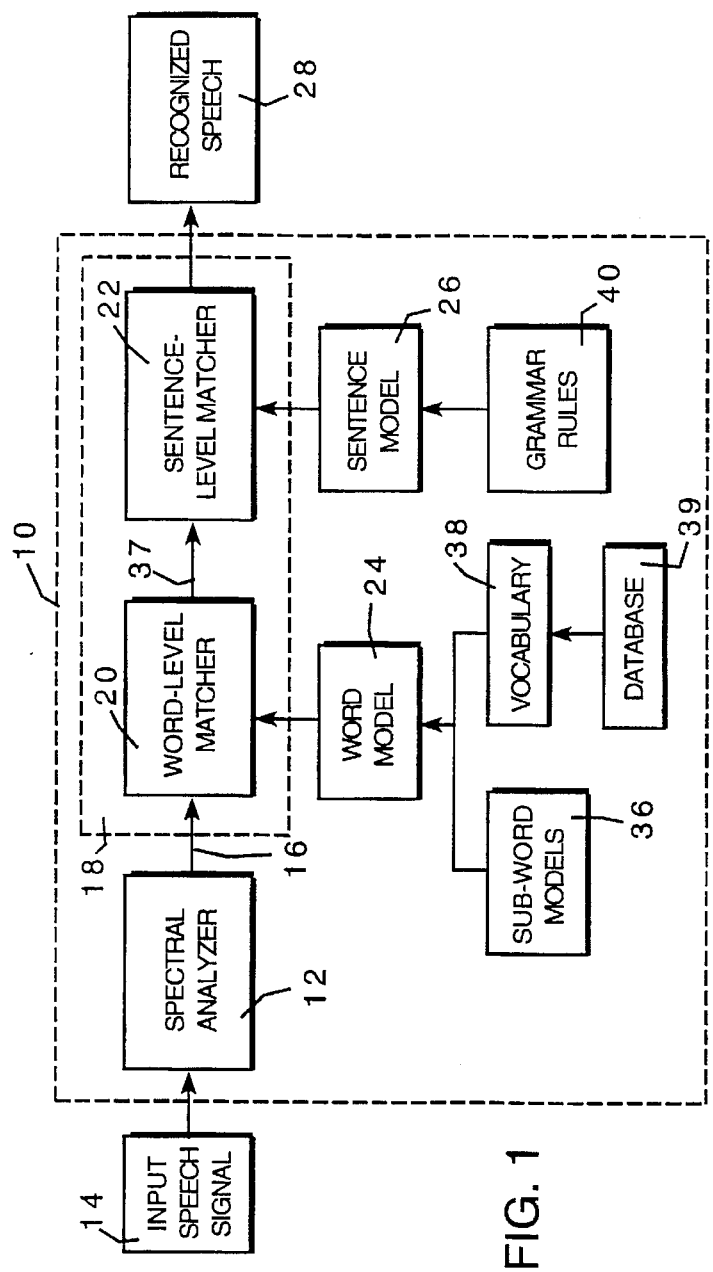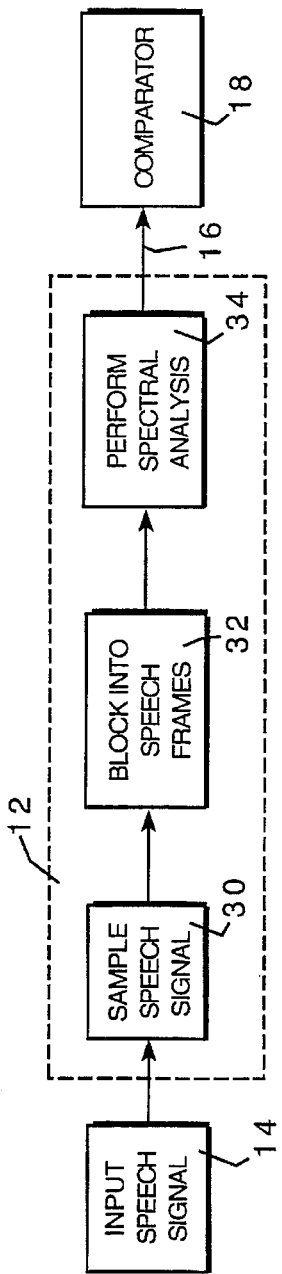

AUTOMATIC SPEECH RECOGNITION

BACKGROUND OF THE INVENTION

This invention relates to automatic speech recognition.

The object of automatic speech recognition is to capture an acoustic signal representative of speech and determine the words that were spoken by pattern matching. Speech recognizers typically have a set of stored acoustic and language models represented as patterns in a computer database (which are the result of training and stored rules of interpreting the language). These models are then compared to the captured signals. The contents of the computer database, how it is trained, and the techniques used to determine the best match are distinguishing features of different types of speech recognition systems. In small vocabulary applications (less than 50 words), a model can be generated for each of the words in the recognition vocabulary. Above this vocabulary size, training models and recognition algorithms require impractically large computations. Therefore, large vocabulary systems (greater than about 1000 words) train models for a smaller number of sub-word speech segments, e.g., phonemes. These phonemes can then be concatenated to produce a model of one or more words.

Various speech recognition schemes are known. In a segmental models approach, it is assumed that there are distinct phonetic units (e.g., phonemes) in spoken language that can be characterized by a set of properties (features) in the speech signal over time. Input speech signals are segmented into discrete sections in which the acoustic properties represent one or more phonetic units and labels are attached to these regions according to these properties. A valid vocabulary word, consistent with the constraints of the speech recognition task, is then determined from the sequence of assigned phonetic labels.

Template-based approaches use the speech patterns directly without explicit feature determination and without segmentation. A template-based recognition system is initially trained using known speech patterns. During recognition, unknown speech signals are compared with each possible pattern learned in the training phase and classified according to how well the unknown patterns match the known patterns.

Recently, hybrid approaches to speech recognition have become popular. Hybrid approaches combine certain features of the above-mentioned segmental model and pattern-matching approaches. In certain systems an expert system has been used for segmentation so that more than just acoustic information is used in the recognition process. Also, neural networks have been used for speech recognition. For example, D. W. Tank and J. J. Hopfield (in "Neural Computation by Concentrating Information in Time," *Proc. Nat. Academy Sciences*, 84: 1896–1900, April 1987) describe a pattern recognition scheme in which conventional neural network architectures are used to estimate the acoustic features of speech. A pattern classifier detects the acoustic feature vectors and convolves them with filters matched to the acoustic features and sums up the results over time.

One of the major complicating factors in the recognition of continuous speech is that word boundaries are often difficult to classify from other spectrum information (e.g., interfering background signals). The difficulty of classifying boundaries between words or sub-word units (e.g., phonemes) in continuous speech recognizers has added complexity to training and recognition algorithms. This directly affects the cost and the performance of such systems. As used herein a boundary frame is defined as a frame that is between two acoustic events (e.g., the frame that is between the phoneme "k" and the phoneme "aa" in the utterance "cat"). An interior frame is defined as a frame that is within an acoustic event (e.g., a frame that is within the phoneme "aa").

Known continuous speech recognition systems based on segmental models hypothesize a boundary at a fixed rate that is selected to guarantee that boundaries are not missed (e.g., at 100 Hz, or every 10 milliseconds). However, this scheme is computationally intensive and requires further classification processing downstream to compensate for artificially generated segments (i.e., processing to delete incorrectly assumed boundaries, which can be measured as a "boundary deletion rate").

SUMMARY OF THE INVENTION

In a general aspect, the invention features a scheme for recognizing speech represented by a sequence of frames of acoustic events separated by boundaries by processing the frames of speech to assign to received frames respective boundary probabilities representative of the degree to which the frames of speech correspond to stored representations of boundaries between acoustic events. The boundary probabilities assigned to the frames of speech are used in subsequent processing steps to enhance recognition of speech.

Embodiments of the invention may include one or more of the following features. The frames of speech are preferably received at a fixed rate. Preferably, a speech signal representing a spoken sequence of one or more words is received, the speech signal is processed into a sequence of overlapping frames, and each of the overlapping frames is received for processing and assignment of respective boundary probabilities. A boundary probability is preferably assigned to a respective frame of speech by using information about one or more neighboring frames of speech (e.g., a frame of speech adjacent the respective frame of speech, two neighboring frames of speech, or one or more speech frames preceding the respective frame of speech and one or more speech frames subsequent to the respective frame of speech). The boundary probability assigned to a respective speech frame is preferably adjusted by further processing. An assigned boundary probability is preferably changed based on a boundary probability assigned to at least one neighboring frame of speech (e.g., one or more speech frames preceding the respective frame of speech and one or more speech frames subsequent to the respective frame of speech).

In certain preferred embodiments, speech frames are processed by an artificial neural network (ANN). For example, the assignment of boundary probabilities and the further adjustments of the assigned probabilities are preferably conducted by an ANN. The ANN is preferably trained based on only selected portions of continuous training speech.

As mentioned above, the assigned boundary probabilities are used in subsequent processing steps to enhance recognition of speech. A network of speech segments comprising concatenated frames of speech is preferably created based on frames of speech assigned a boundary probability greater than a preselected threshold value. Preferably, in the formation of a network of speech segments, certain concatenations of stored reference acoustic events are prevented based on speech assigned a boundary probability greater than a second preselected threshold value that is greater than the first preselected threshold value. In the recognition process, words in a stored vocabulary are preferably assigned probabilities representative of the degree to which the words match the speech segments. The entire recognition process is preferably conducted probabilistically and the recognized output speech signal is the grouping of one or more words with the highest probability, consistent with the language model specified by selected grammar rules.

Among the advantages of the invention are the following. By assigning probabilities to boundaries between acoustic events and using these boundary probabilities in the creation of networks of speech segments, subsequent processing required to recognize speech is simplified and made more computationally efficient, increasing recognition accuracy and speed. Using a two-stage classification process (i.e., boundary classification and acoustic event classification) significantly decreases the computational load by eliminating consideration of unlikely segments early in the recognition process. This greatly improves the overall accuracy of the recognition process since larger contexts can be efficiently and effectively represented by such a two-stage process.

The invention provides a scheme for recognizing speaker-independent continuous speech that can handle large vocabularies (e.g., greater than 1000 words). The invention can be implemented in software in a manner that allows adjustments to be made to the vocabulary and to the grammar rules in real-time without requiring recompiling or additional training. Such a system is also highly portable and can take advantage of future improvements in, e.g., microprocessor processing speeds. Also, assigning boundary probabilities to speech frames provides the ability to easily tailor the recognizer for different hardware platforms by selecting appropriate threshold values. For example, low threshold values can be used with fast processing systems to increase recognition accuracy, whereas higher threshold values can be used with slower processors to provide real-time speech recognition despite the speed limitations of the system.

This approach to boundary classification applied to continuous speech recognition has enabled us to vary the boundary deletion rate by varying the probability threshold of a frame being hypothesized as a boundary between two acoustic events (e.g., phonemes). Previous schemes obtained a boundary deletion rate of 2.2% with an average boundary hypothesis period of 26 milliseconds. Using the boundary classification scheme of the present invention achieves a boundary deletion rate of 0.2% with an average boundary hypothesis period of 28 milliseconds. Thus, we have reduced the error rate (i.e., boundary deletion rate) by a factor of 11, while increasing the average deletion period by 2 milliseconds. The invention thus provides a significant improvement in both accuracy and rate at which boundaries are hypothesized. The invention also reduces the number of segments needed for classification and results in improved accuracy.

Other features and advantages will become apparent from the following description and from the claims.

BRIEF DESCRIPTION OF THE DRAWINGS

FIG. 1 is a block diagram of a continuous speech recognizer.

FIG. 1A is a flow diagram of the steps performed by a spectral analyzer.

DESCRIPTION OF THE PREFERRED EMBODIMENTS

Figure 2:
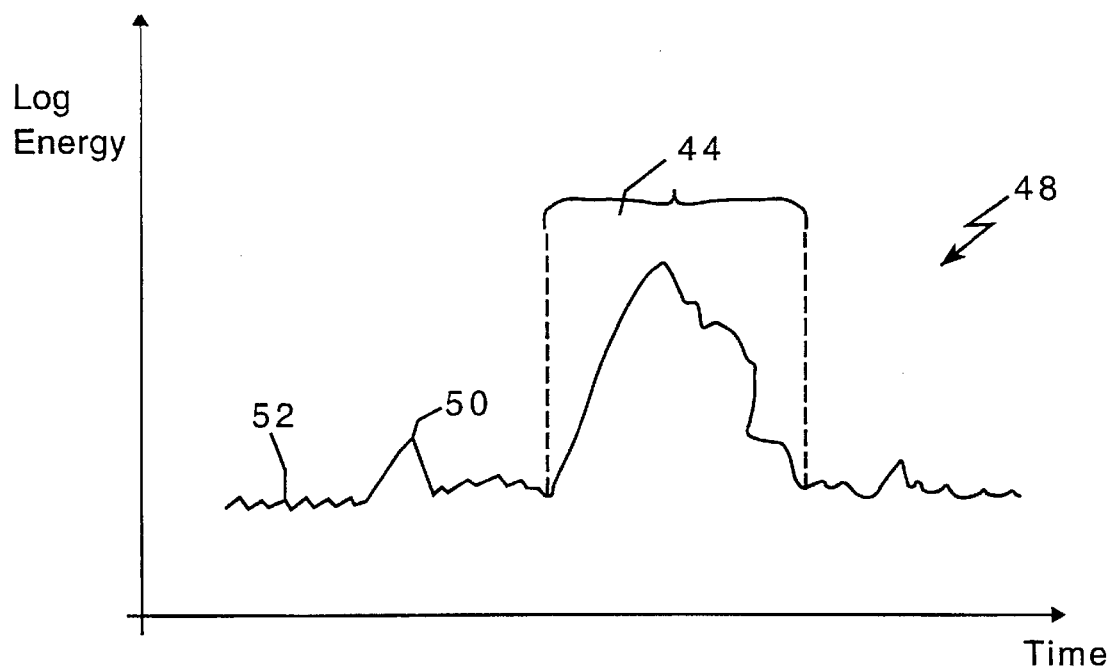
FIG. 2 is a log energy contour plot of an utterance including hypothesized boundaries between the portion of the utterance corresponding to speech and the portion corresponding to background.

Referring to FIG. 1, a speech recognizer 10 includes a spectral analyzer 12 for receiving an input speech signal 14 and for providing a feature vector sequence 16 representative of the input speech. A comparator 18 performs word-level 20 and sentence-level 22 matching based respectively on stored word models 24 and sentence (language) models 26 to provide an output 28 representative of recognized speech. Each step of the recognition process performed by recognizer 10 is conducted probabilistically and the recognized output speech signal is the word and sub-word grouping with the highest probability, consistent with the language model specified by selected grammar rules.

Spectral analyzer 12 samples analog input speech signals (e.g., the voltage output of a microphone which receives spoken words) at a sampling rate of 8 kHz or 16 kHz, depending on whether the application is narrow-band (e.g., over telephone lines) or broad-band (e.g., microphone-based), respectively. The sampling rate is typically selected to be slightly more than twice the highest frequency of the associated speech signal received by the recognizer.

As shown on FIG. 1A, after sampling (30) the input speech signal, spectral analyzer 12 blocks (32) the sampled speech signal into frames ("speech frames") by placing a "window" over the samples that preserves the samples in the time interval of interest, while eliminating all others. The analyzer 12 then performs (34) spectral analysis (e.g., computes a short term Fourier transform) on the window of samples to provide a feature vector sequence 16, consisting of a set of parameter coefficients (e.g., cepstral coefficients, discussed below) characteristic of each speech frame. The window is placed over overlapping intervals of the sampled speech signal at a predetermined "windowing rate" to obtain a sequence of spectra representative of the spectral characteristics of input speech signal 14 over time.

In the embodiment shown, the speech frame window is 26 milliseconds (i.e., 416 samples or 208 samples, depending on whether the sampling rate is 16 kHz or 8 kHz) and the windowing rate is 10 milliseconds (i.e., there is 16 milliseconds shared by adjacent speech frames), corresponding to the duration of the shortest phoneme in the sub-word dictionary, described below (e.g., the phoneme "b"). This corresponds to a speech frame rate of 100 frames per second.

The data in the resulting speech frames is compressed by performing (34) spectral analysis on each speech frame to obtain a feature vector 16, consisting of nine cepstral coefficients for each speech frame (the first six cepstral coefficients are used for boundary classification and all nine cepstral coefficients are used for phonetic classification, as described in detail below). We note that any number of cepstral coefficients may be used, although eight to ten coefficients are usually preferred. The cepstral coefficients are the coefficients of the Fourier transform representation of the log magnitude spectrum of each speech frame.

Feature vectors 16 (FIG. 1) are received by word-level matcher 20 that uses a set of pre-trained representations of sub-word (e.g., phoneme) models 36 (e.g., stored as weights in the nodes of an artificial neural network, as described in detail below) and a user-defined vocabulary 38, which accesses a database 39 (e.g., a phonetic dictionary such as CMU PHONE, which is publicly available from Carnegie Mellon University and accessible over the Internet, or TIMIT, which is available from the Oregon Graduate Institute and is also publicly accessible over the Internet) to create a set of probabilities 37 corresponding to the probabilities that the words in vocabulary 38 "match" the incoming sequence of feature vectors 16. The set of word probabilities are created by first determining for each sub-word model (there are about forty phonemes in the english language) the probability the sub-word model matches a given speech frame. The sub-word probabilities are then used to assign respective probabilities to the words in the vocabulary, which consist of a respective sequence of sub-words that are stored in database 39. Sentence-level matcher 22 receives the set of word probabilities from the word-level matcher and combines them into sentences based on a set of grammar rules 40. Sentence-level matcher 22 provides a recognized speech signal 28 representative of the sentences with the highest overall probability.

Word-level and sentence-level matching is significantly improved, in terms of accuracy and computational complexity, if we can assume that the speech frames and reference patterns being compared correspond to actual speech (e.g., all background and other interfering signals have been eliminated from consideration). We have discovered an accurate and efficient scheme for reliably separating speech from interfering signals and for accurately classifying boundaries between sub-word groups, such as phonemes.

The goal of boundary classification is to separate acoustic events of interest in a continuous signal from other parts of the signal (e.g., background noise). Boundary classification is particularly difficult for continuous speech applications because the word boundaries are not always evident. For carefully articulated speech, spoken in a relatively noise-free environment, accurate boundary classification is relatively easier. However, in practice, one or more problems make accurate boundary classification difficult. One particular problem is due to the method of producing speech. For example, during articulation, a speaker often produces sound artifacts, including lip smacks, heavy breathing, and mouth clicks and pops. In addition to speaker-produced sound artifacts, environmental conditions (e.g., noise from fans or operating machinery, irregular noises, and background conversation) produce interfering signals that have characteristics very similar to the characteristics of speech.

Figure 2A:
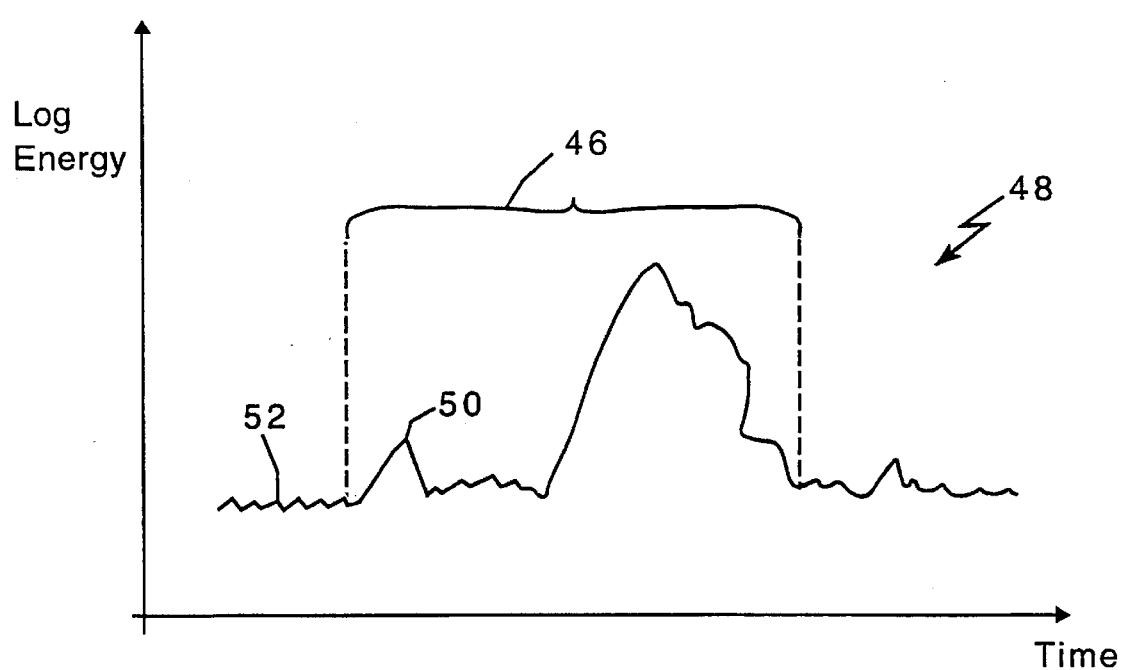
FIG. 2A is a log energy contour plot of the utterance of FIG. 2 including different hypothesized boundaries.

As shown in FIGS. 2 and 2A, two word-boundary locations 44, 46 are possible in the log energy contours of an utterance 48 having an initial high-frequency, transient initial sound 50. Word-boundaries 44 correspond to the case in which initial sound 50 is classified as part of background signal 52 (e.g., when sound 50 is a typical mouth click or pop produced by opening the lips, prior to speaking, e.g., when the mouth is relatively dry). Boundaries 46, on the other hand, correspond to the case in which initial sound 50 is treated as, e.g., a fricative (e.g., the initial part of a word like "stop") and classified as part of a word. Therefore, depending on the boundary classifications, the accuracy of the recognized words will be greatly affected.

Figure 3:
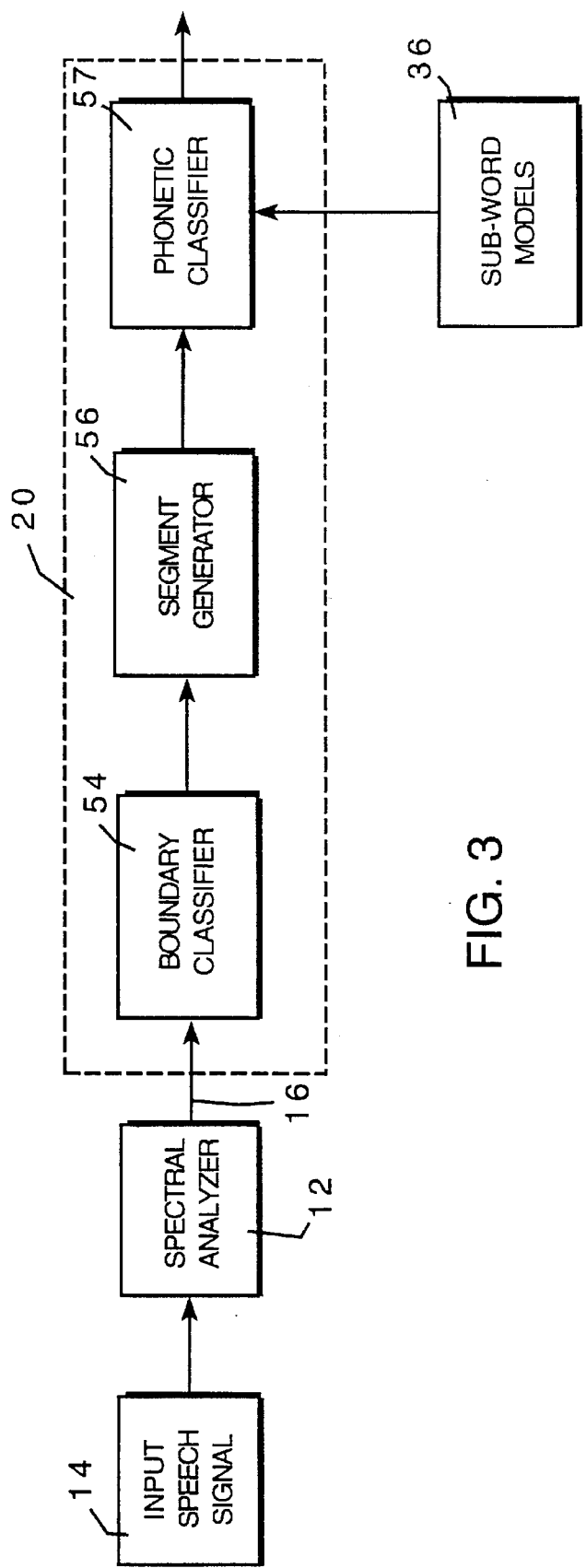
FIG. 3 is a block diagram of the front end of the continuous speech recognizer of FIG. 1.
Figure 3A:
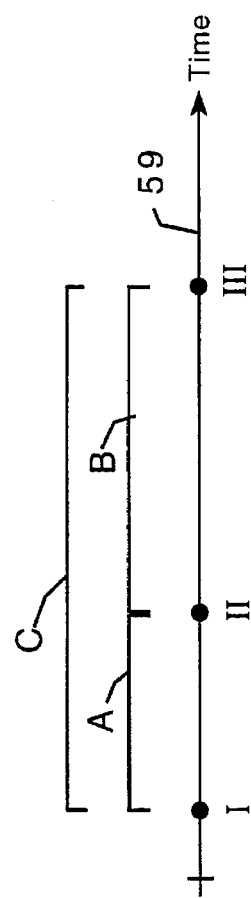
FIG. 3A is a diagrammatic illustration of boundary location and segment generation along a sequence of speech frames.

Referring to FIG. 3, at the front-end of word-level matcher 20 (FIG. 1) is a boundary classifier 54 that assigns to each speech frame a probability that the speech frame corresponds to a boundary between two phonemes (a second probability corresponding to the probability that the speech frame is between phoneme boundaries is also assigned for use in the training algorithm described below). If the boundary probability assigned to a speech frame is greater than a first threshold (e.g., 70%), the frame is assumed to be a boundary by a segment generator 56, which generates a network of speech segments (A, B and C), as shown in FIG. 3A. A phonetic classifier 57 generates probabilities for each of the phonemes in sub-word models store 36 based on the network of speech segments produced by segment generator 56.

Referring to FIG. 3A, in operation, boundary classifier 54 classifies boundaries I, II and III in a speech frame sequence 59. Segment generator 56 produces speech segments A, B and C based on the classified boundaries. To further reduce the search space for the downstream processors, if the boundary probability assigned to any of the boundaries I, II or III is greater than a second threshold (e.g., 82%), which is higher than the first boundary threshold, the segment generator will not produce a segment that crosses that boundary. For example, if the boundary probability for boundary II is greater than the second boundary threshold, the segment generator would not produce segment C, because it assumes that boundary II corresponds to a true boundary.

We note that the particular values for the first and second boundary thresholds can be set to any desired values depending on the desired recognition accuracy and the desired processing speed, which is hardware dependent. Higher boundary threshold probabilities tend to reduce recognition accuracy and increase recognition speed, whereas lower boundary threshold probabilities tend to increase recognition accuracy (because more potential boundaries are hypothesized) and decrease recognition speed.

Figure 4:
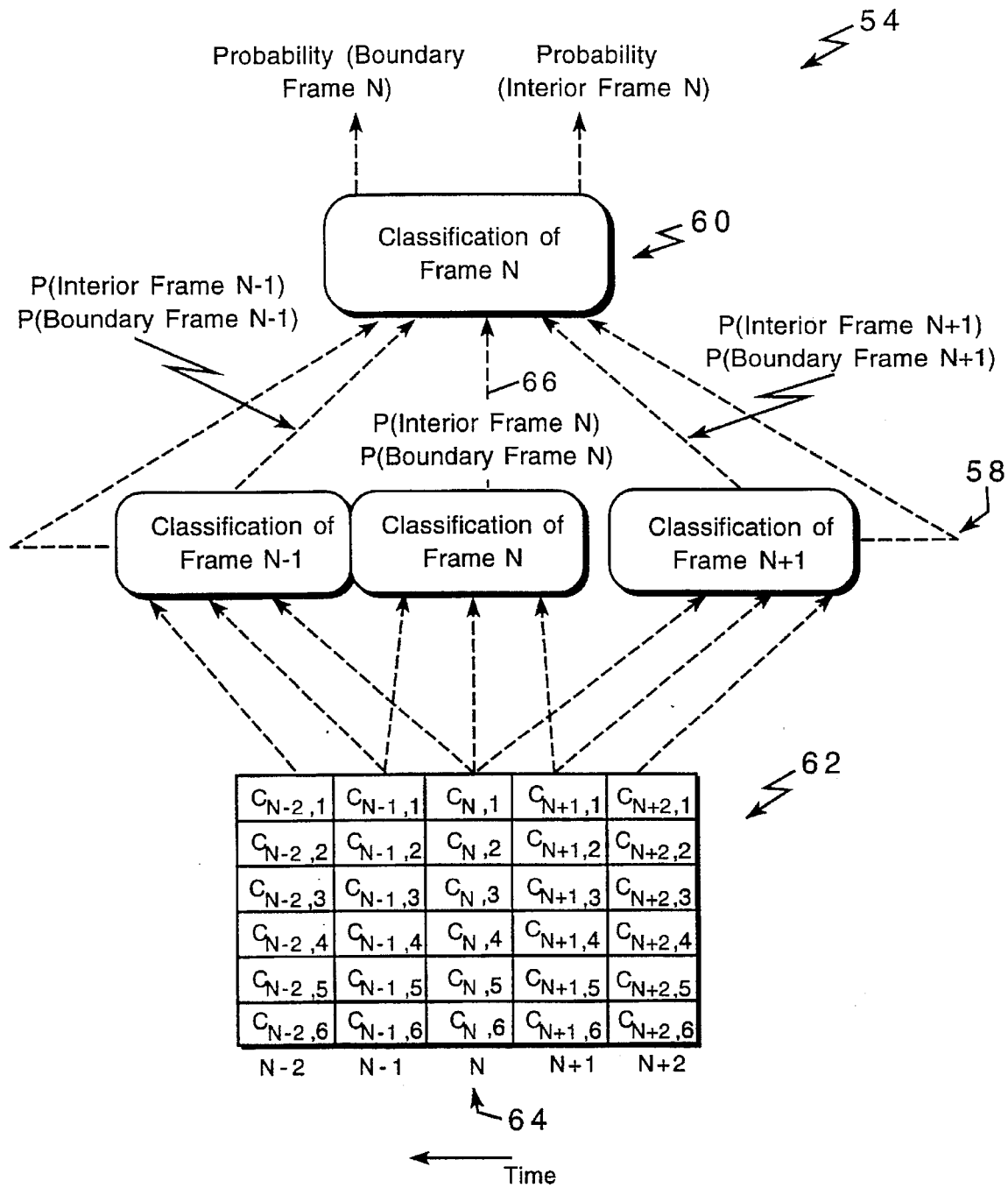
FIG. 4 is a flow diagram of the classification stages of a boundary classifier.

The process by which each speech frame is assigned a boundary probability is a two stage classification process. Referring to FIG. 4, a boundary classifier 54 includes a first stage classifier 58 and a second stage classifier 60. The first stage classifier acts as a data reduction/compression engine. The first stage classifier (e.g., an artificial neural network (ANN), or other form of classifier or data compaction technique, such as a principle component analyzer) receives at its input sequences of speech frames 62 (labeled by frames N−2 to N+2; each frame being represented by six cepstral coefficients labeled $C_{i,1}$–$C_{i,6}$, where i corresponds to the associated frame label) taken at and around frame 64 (frame N) to be classified. The output 66 of first stage classifier 58 is a vector of two probabilities representing the probability the frame corresponds to a boundary frame the probability the frame corresponds to an interior frame (used in training). Second stage classifier 60 receives at its input the boundary classification for frame N and the boundary probability classifications of one or more frames from either side of frame N. The second stage uses more context than the first stage classifier to further classify frame N because it receives as input the output probabilities of the first stage classifier rather than the direct acoustic measurements of the input speech signal.

The second stage classifier produces an output representative of the probabilities that the frame to be classified corresponds to a boundary frame and an interior frame. Generally only boundary frame probabilities are used for downstream processing, whereas boundary frame probabilities and interior frame probabilities are used for training the recognizer, as described below.

Figure 5:
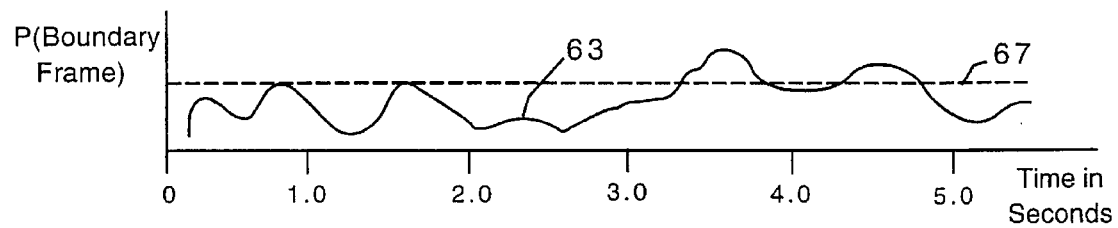
FIG. 5 is a plot of an output of the first stage of the boundary classifier of FIG. 4 as a function of time.
Figure 5A:
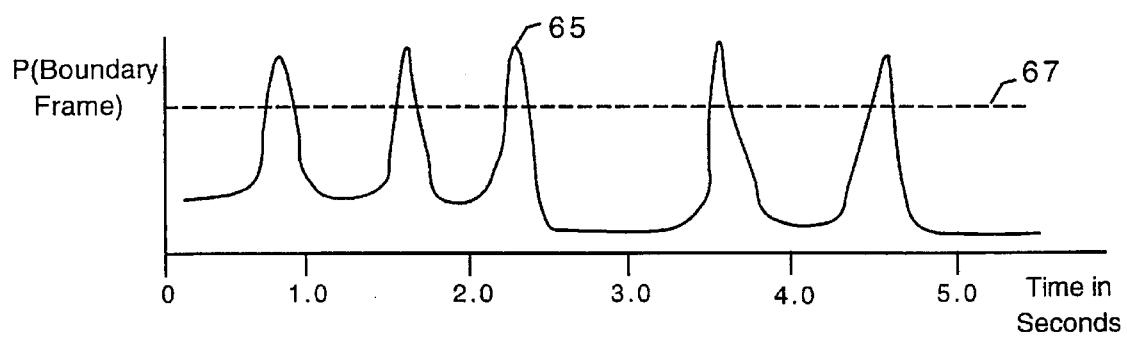
FIG. 5A is a plot of an output of the second stage of the boundary classifier of FIG. 4 as a function of time.

FIGS. 5 and 5A respectively illustrate the outputs of the first and second stage classifiers, while processing a typical speech frame sequence (the boundary probability assigned to a speech frame is presented on the vertical axes and the elapsed time is presented on the horizontal axes). The output of the first stage classifier is broad and flat relative to the output of the second stage classifier. Peaks represent frames that have high probabilities of corresponding to boundaries between phonemes. The second stage classifier accentuates peaks (i.e., provides more distinct probability values) and has a high boundary classification accuracy. For example, compare the two outputs 63, 65 at a time of approximately 2.4 seconds. The peak 63 is relatively low after the first stage classifier (thus, the probability that the frame is a boundary is low), but corresponding peak 65 after the second stage classifier is much higher. Applying a threshold 67 (e.g., a boundary probability greater than 70%) to the output of the first stage classifier would have missed peak 63. However, if a threshold is applied after the second stage classifier, peak 63 would not be missed. In other words, a fixed threshold applied after the second stage classifier is more likely to properly classify phoneme boundaries. Thus, the second stage classifier serves as a peak-picking processor for processing the boundary probability data to obtain a new set of probability data in which there are narrower peaks.

As discussed above, in a presently preferred embodiment, two thresholds are used. A first threshold (e.g., 70%) determines whether a frame is a possible boundary. Another higher threshold (e.g., 82%) determines whether the frame is so likely to be an actual boundary that subsequent processing does not allow the boundary to be "crossed" (i.e., subsequent processing cannot consider the possibility that the a phoneme can span across such a boundary and all phonemes begin and end at such a boundary).

Figure 6:
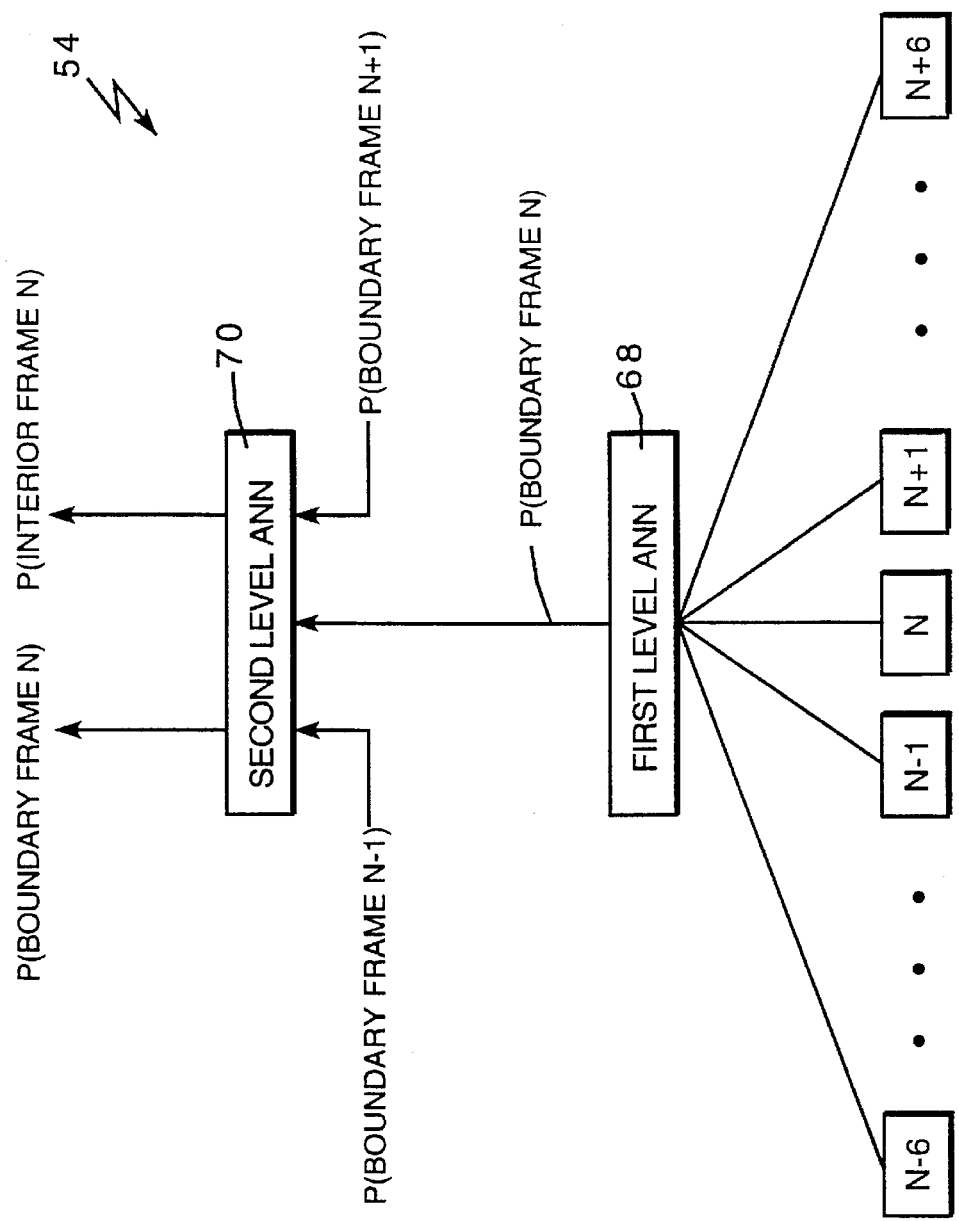
FIGS. 6, 6A and 6B are schematic diagrams of a fully-connected, feed-forward artificial neural network for use with a boundary classifier.

Referring to FIG. 6, boundary classifier 54 is implemented as two fully-connected, feed-forward ANNs 68, 70 arranged in series. An ANN 68 corresponds to a first stage classifier and an ANN 70 corresponds to a second stage classifier. Each ANN 68, 70 is a three-layer network that learns by a back-propagation process, as described below.

Figure 6A:
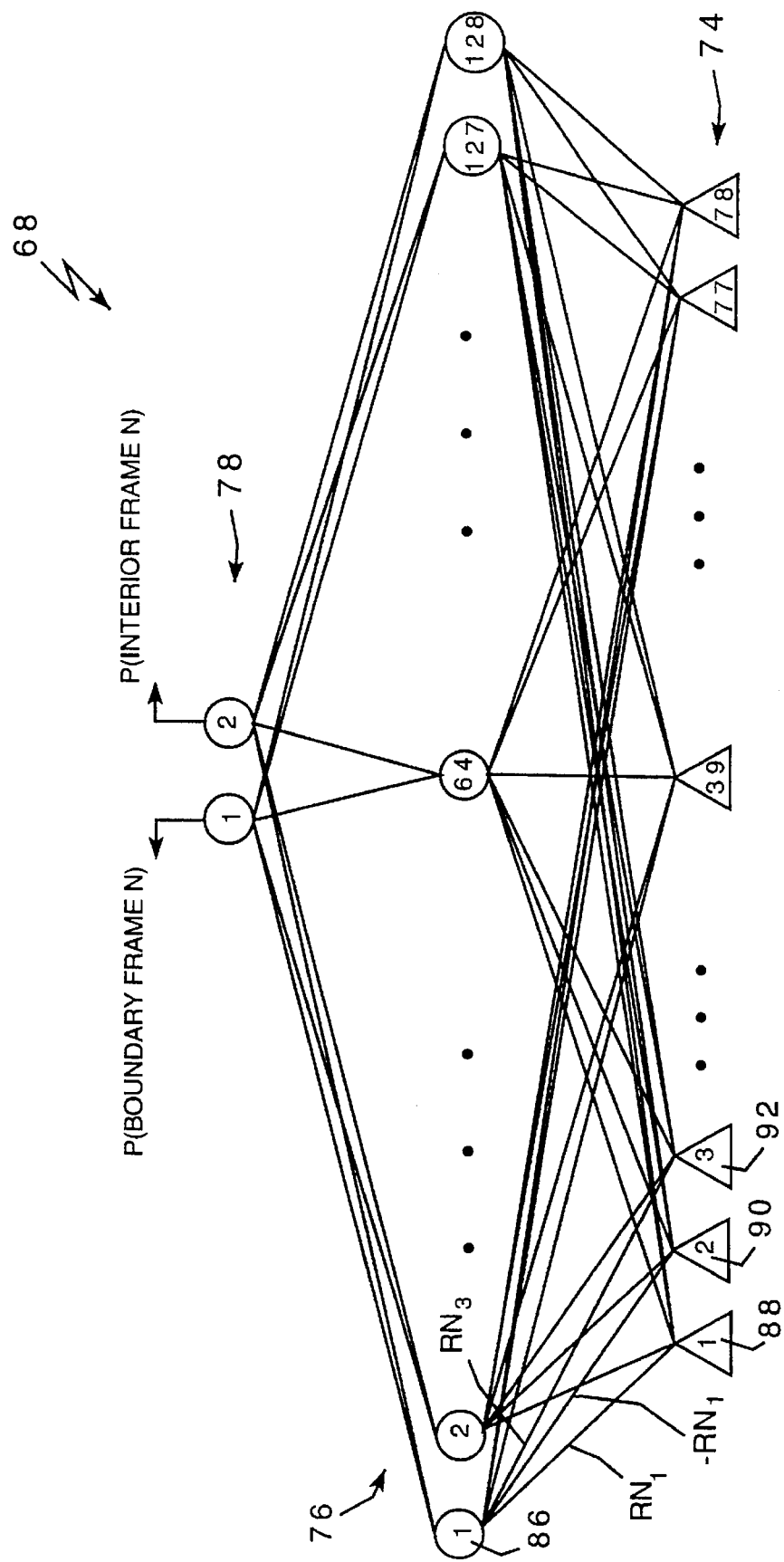

Referring to FIG. 6A, in a presently preferred embodiment, input data 72 includes signals (in the form of cepstral coefficients) from six frames before (N−6 to N−1) and six frames after (N+1 to N+6) the frame to be classified (N). The input data enter the first level ANN 68 through an input layer 74, consisting of seventy-eight input nodes (thirteen frames multiplied by six cepstral coefficients per frame). The nodes of the input layer are passive, not computational. Each node of input layer 74 sends a single data value (cepstral coefficient) over weighted connections to a hidden layer 76 of one hundred twenty-eight nodes. Each input node is connected to each of the hidden layer nodes. All hidden nodes thus receive all input data. Each hidden node processes its inputs and sends a resultant signal to an output layer 78 having two output nodes. The output nodes also have distinct sets of weights and process the received signals to produce an output. The hidden and output nodes process their inputs in two steps. Each node multiplies every input by its weight, adds the product to a running total, and then passes the sum through a nonlinear filtering function to produce its result. The filtering function is preferably a sigmoid function.

Figure 6B:
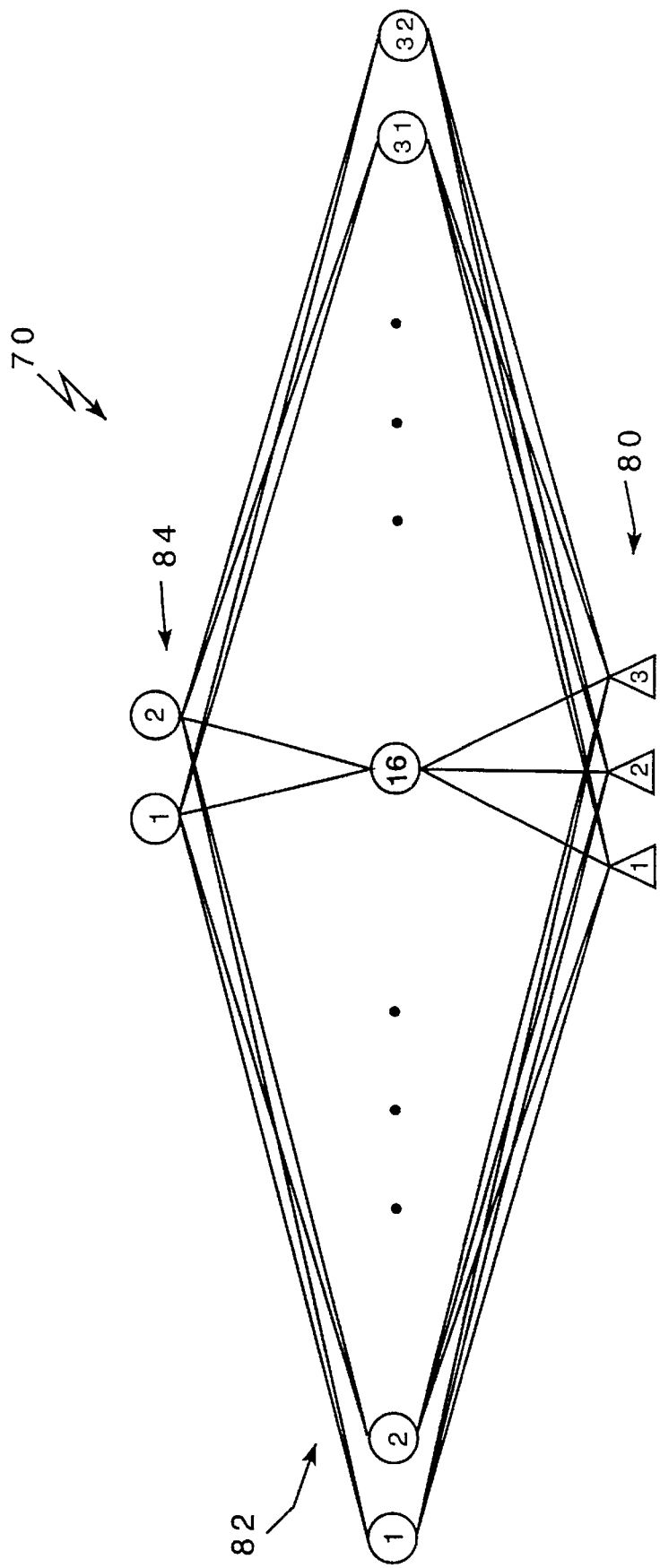

As shown in FIG. 6B, ANN 70 is very similar to ANN 68, except ANN 70 has a three-node passive input layer 80, a thirty-two-node hidden layer, and a two-node output layer.

As mentioned above, the ANN-implemented boundary classifier is trained using a back propagation process using weighted means squared error as the error criterion. The key to back propagation learning is the ability to change the weights (e.g., between the input nodes and the hidden nodes and between the hidden nodes and the output nodes) in response to errors. This requires training data containing a series of input patterns labeled with their target output patterns. During training the boundary classifier passes each input pattern through the hidden layers of each ANN 68, 70 and generates a result at each output node. It then subtracts the actual result from the target result to determine the errors. The boundary classifier then passes the errors back to the output and hidden layers, using the original weighted connections. Each output and hidden node then calculates the weighted sum of the back-propagated errors to find its indirect contribution to the known output errors. After each output and hidden node determines its respective error value, the node adjusts its weights to reduce its error. The equation that changes the weights is selected to minimize the sum of the network's squared errors.

In particular, during training, the weights of each of the output and hidden nodes for each ANN are set as follows. Referring to FIG. 6A, the weight between, e.g., a first hidden node 86 and a first input node 88 is set to a randomly generated number ($RN_1$) between zero and one. The weight between first hidden node 86 and second input node 90 adjacent first input node 88 is set to $-RN_1$. The weight between the first hidden node 86 and a third input node 92 is once again set to a randomly generated number ($RN_3$) between zero and one. The weights for each of the hidden and output nodes are assigned in this fashion so that the sum of the weights assigned to any given hidden node is approximately zero.

The ANNs 68, 70 are trained to classify boundaries using actual speech and training is only performed on selected frames that are likely to involve phoneme boundaries. Only a few frames from the middle of the phonemes are used in training. This significantly reduces the number of frames necessary for training and thereby reduces the amount of training time required. The training is completed before the recognizer is put into the field to provide speaker-independent recognition. Vocabulary can be added merely by adding words to the vocabulary stored in a computer database.

After the phoneme boundaries are classified, recognizer 10 determines the probability that particular segments (formed from frames between boundaries) correspond to known phonemes. These probabilities are combined with the boundary probabilities to provide sets of overall probabilities, and the most probable choice is selected. In particular, once a set of boundaries has been hypothesized, the next stage is to connect these boundaries together to form segments. Adjacent segments are then connected to produce a segment network. Finally each segment in the segment network is classified by a phonetic classifier. The phonetic classifier assigns to each segment a probability for each of the phonemes that are to be recognized. In a presently preferred embodiment, ANN technology is used to classify segments. The use of this technology has significantly improved our acoustic modeling and therefore, our phonetic classification performance. In a final stage of phoneme discrimination, the boundary and phonetic classifiers work together to generate a phoneme lattice that includes all possible sequences that could represent recognized speech. Once the set of most probable boundaries and the set of most probable phonemes are combined, the optimal phonetic sequence in the generated phoneme lattice is obtained (e.g., the one with the highest probability).

Figure 7:
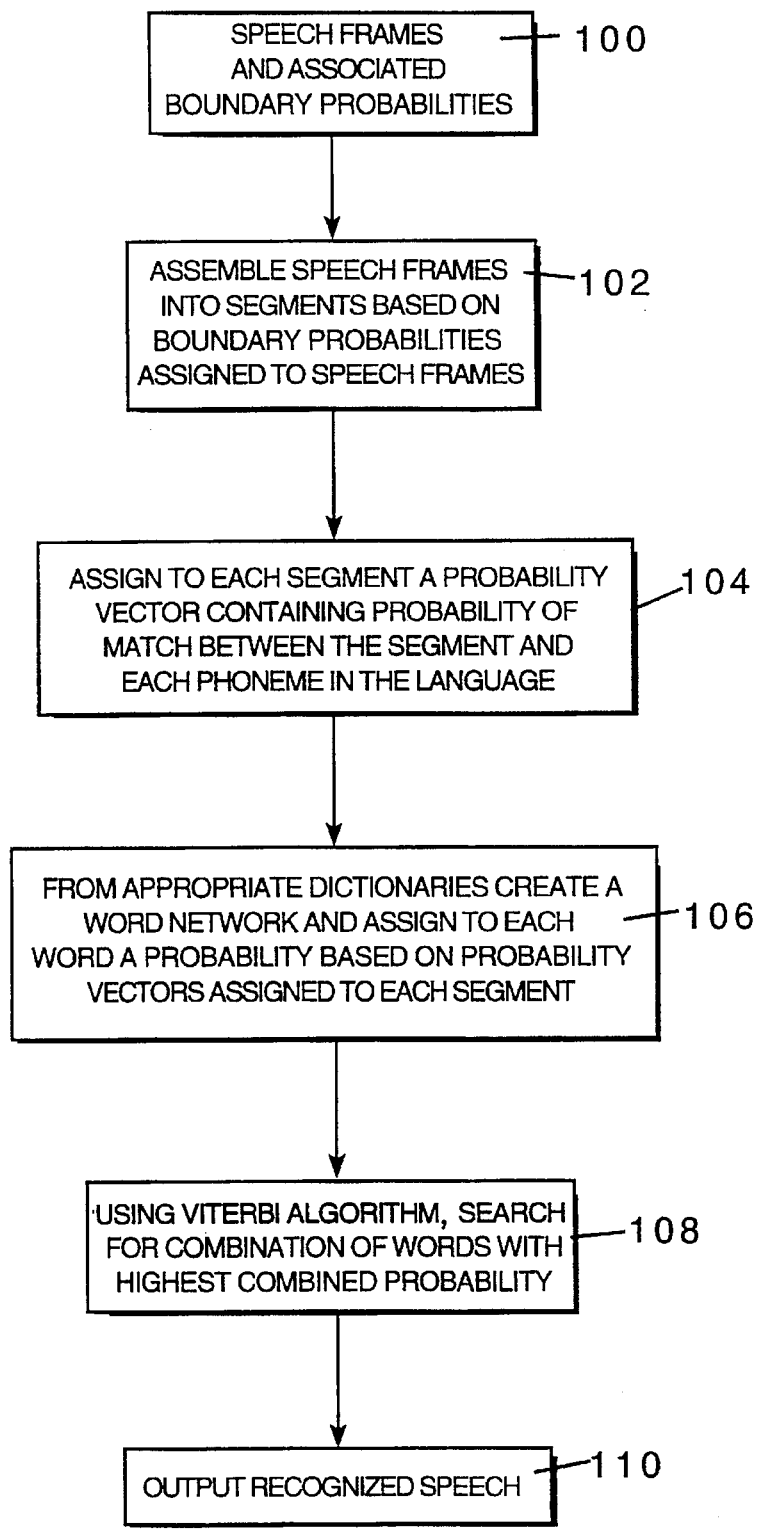
FIGS. 7 and 7A are flow diagrams of a process for automatically recognizing speech.
Figure 7A:
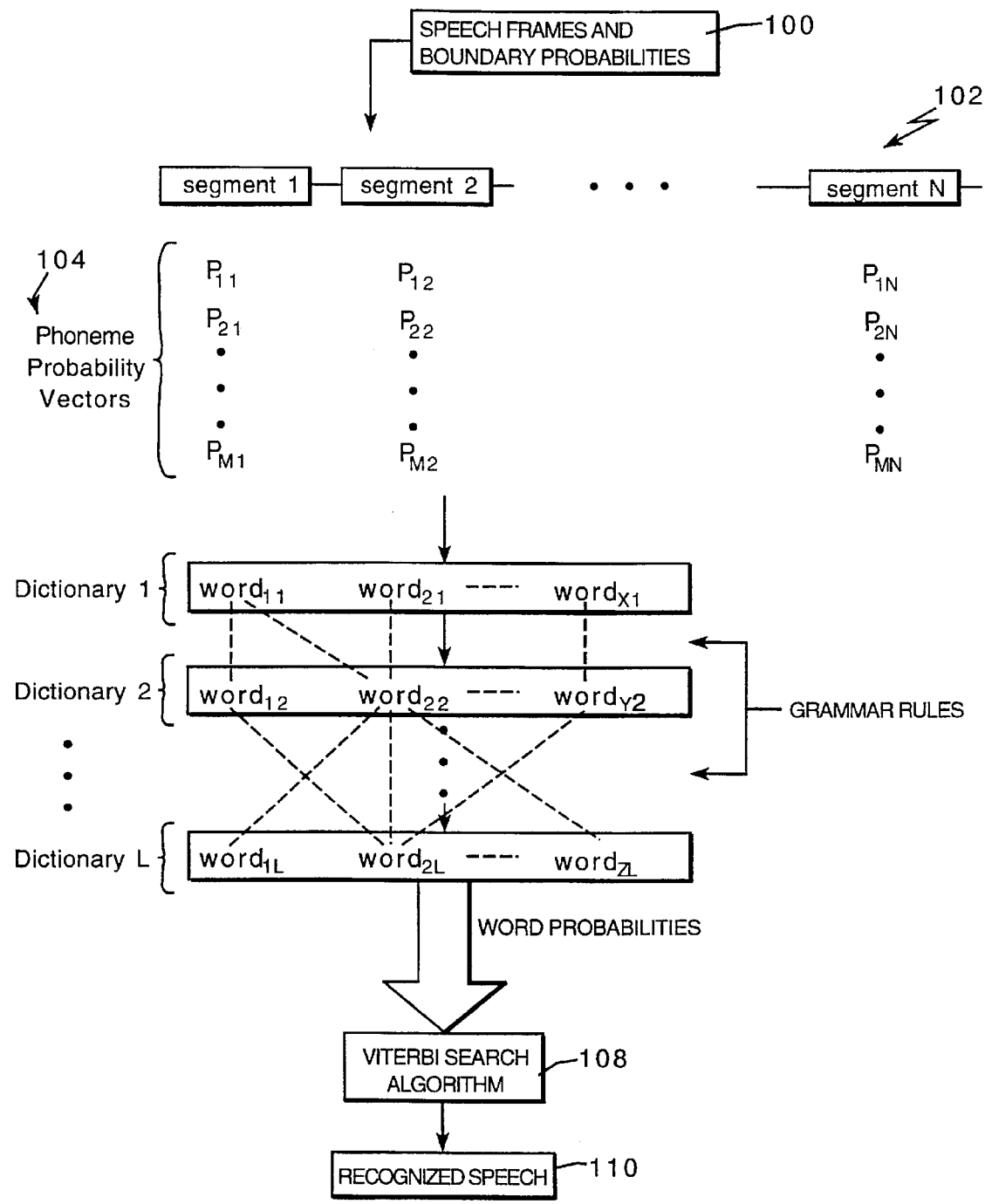

Referring to FIGS. 7 and 7A, recognized speech is obtained from the following sequence of processing steps. After boundaries have been assigned to each speech frame, the speech frames are input (100) into the segment generator, which assembles (102) the frames into segments based on the assigned boundary probabilities. Each segment is assigned (104) a probability vector containing the probability the segment matches each phoneme in the language (e.g., english has about 40 phonemes). The segments and their respectively assigned probability vectors are "filtered" through appropriate dictionaries allowed by predetermined grammar rules to create allowable word networks in which each word is assigned (106) a probability based on the phoneme probabilities in the probability vectors. A Viterbi algorithm is used (108) to search through the word networks and determine (decode) the word sequence with the highest combined probability based on the assigned word probabilities, which is output (110) as recognized speech.

The probability vectors are assigned (104) to each segment based on a technique described in B. Chigier, "Phonetic classification on wide-band and telephone quality speech," *Proceedings 5th Workshop*, presented at Arden House, N.Y. (1992), which is herein incorporated by reference. In a presently preferred embodiment, sixty-four representational coefficients are used to classify a segment. In particular, each segment is divided in time into three equal sub-segments, which are processed by averaging the nine cepstral coefficients of each of the frames corresponding to each sub-segment, for a total of twenty-seven average cepstral coefficients for a given segment (nine cepstral coefficients are preferably used to represent each frame for phonetic classification; see page 9). For example, a segment consisting of six frames would be divided into three sub-segments each having two frames, and the twenty-seven average cepstral coefficients would be generated by averaging the coefficients across the frames of each sub-segment (i.e., the first cepstral coefficient of the first frame of the first sub-segment is averaged with the first cepstral coefficient of the second frame of the first sub-segment, etc.). We note that other data compression techniques may be used. Also, each segment may be divided into any number of sub-segments; the number of sub-segments being determined by the desired accuracy and the desired operating speed, which depend on the performance of the processor and the number of coefficients used to represent each frame.

Co-articulation effect features are also used to classify a given segment. In a presently preferred embodiment, cepstral coefficients generated from frames (six cepstral coefficients for each frame) processed by spectral analyzer 12 (FIG. 1) are used. In particular, three frames before and three frames after the frame to be classified are processed for a total of thirty-six co-articulation cepstral coefficients. The co-articulation features enables contextual information to be used to classify each segment. For example, the "t" in "stop" may be pronounced as a "d" by certain speakers. However, by using the additional contextual information from neighboring phonemes, the recognition accuracy increases. A segment duration feature is also used to classify the segments. This feature is simply the length of a given segment measured in milliseconds. The twenty-seven sub-segment features, the thirty-six co-articulation features, and the segment duration feature are all passed to phonetic classifier 57 (FIG. 3).

In a presently preferred embodiment, the segment classification system is implemented as a fully-connected, feed-forward ANN having 64 input nodes, 128 hidden nodes, and 40 output nodes, corresponding to forty phonemes in the english language. This ANN is of similar construction and is trained in a similar manner as the ANNs described above in connection with FIGS. 6A and 6B.

The Viterbi algorithm (e.g., as described in Viterbi, "Error bounds for convolutional codes and asymptotically optimum decoding algorithm," *IEEE Transactions on Information Theory*, IT-13(2), pp. 260≡269 (1967), which is herein incorporated by reference) identifies the most likely sequence of phonemes, given the phoneme lattice created by the word network and the lexicon. Hidden Markov Models (HMMs) are used to implement the Viterbi algorithm to incorporate a fast-match approach to narrow the space of candidate boundaries of phonemes or words (e.g., as described in Bahl et al., "Matrix fast-match: a fast method for identifying a short list of candidate words for decoding," *Proceedings IEEE International Conference on Acoustics, Speech and Signal Processing* (1980), Gupta et al., "Fast search strategy in a large vocabulary word recognizer," *Journal of Acoustical Society of America*, 84(6), pp. 2007–2017 (1988), and Picraccini et al., "Implementation aspects of large vocabulary recognition based on intraword and interword phonetic units," *Proceedings 3rd DARPA Speech and Natural Language Workshop*, (1990), which are all herein incorporated by reference). Fast matching is especially useful here because of the high cost of computation.

Based on an evaluation performed on the TIMIT database using context-independent boundary and phoneme models incorporating a unigram language model, it has been determined that the present recognition process reduces error rate by 15% in comparison to the results reported by Lee in "Large-Vocabulary, Speaker Independent, Continuous Speech Recognition: The SPHINX System," *PhD. Thesis, Computer Science Department*, Carnegie Mellon University, (1988), which is herein incorporated by reference (60.9% correct to 66.5% correct, while keeping insertions below 12%).

The words that are included in the lexicon can have an important effect on recognition accuracy. Therefore, careful selection of the lexical items as well as the base-form pronunciations is important. Easily confused words should be avoided since a distinct set of words of more likely to result in higher accuracy. Most often, words that may have multiple pronunciations are treated as separate entries in the lexicon. Contextual speech effects can be accommodated by selecting an appropriate set of rules, such as those used in the MIT Marble system. This process involves assigning contextual likelihoods to each phoneme for each word in the lexicon. These phoneme likelihoods can be trained in the SUMMIT system (e.g., as described in Zue et al., "The MIT SUMMIT speech recognition system: a progress report," *Proc. of the First DARPA Speech and Natural Language Workshop*, pp. 178–189 (1989), which is herein incorporated by reference).

Alternatively, a data-driven approach, e.g., using classification and regression trees, can be employed (e.g., as described in Bahl et al., referenced above). Given a segment network and a lexicon, the system performs a forward Viterbi search followed by an A* search in the reverse time direction to decode the trellis (segment network and lexicon).

Other embodiments are within the scope of the claims.

In certain embodiments, known rules for possible dropped phonemes are also employed (e.g., in "butter," the "tt" can be pronounced differently by some speakers, and in "david," the trailing "d" is not always pronounced).

The continuous speech recognizer may be implemented in software (e.g., using C or C++), which can be run on a microprocessor. The first-level and second-level ANNs can be implemented as callable functions (e.g., the C++ program can pass a set of values to the neural networks, which in turn pass results back to the main program).

The result of the above-described speech recognition process is context-independent. However, this technique may be easily extended to context-dependent classification by using as many outputs on the second stage classifier as contexts that are to be modeled.

Still other embodiments are within the scope of the claims.

What is claimed is:

1. A method for recognizing speech from a received signal representing a spoken sequence of one or more words comprising the steps of receiving a sequence of frames of acoustic events separated by boundaries, assigning to received frames respective boundary probabilities representative of the degree to which the received frames of speech correspond to stored representations of boundaries between acoustic events, selecting boundary frames based on the boundary probabilities assigned to the frames, using selected boundary frames to generate sequences of one or more words between a first selected boundary frame and a subsequent selected boundary frame, wherein multiple words in any given sequence are separated by one or more selected boundary frames, assigning a score to each generated sequence, and providing an output corresponding to recognized speech using the sequence of one or more words with the highest assigned score.

2. The method of claim 1 wherein the frames of speech are received at a fixed rate.

3. The method of claim 2 further comprising the steps of receiving a speech signal representing a spoken sequence of one or more words, and processing said speech signal into a sequence of overlapping frames.

4. The method of claim 1 wherein a boundary probability is assigned to a given frame of speech based on information about one or more neighboring frames of speech.

5. The method of claim 4 wherein a boundary probability is assigned to a given frame of speech based on information about a frame of speech adjacent to the given frame of speech.

6. The method of claim 4 wherein a boundary probability is assigned to a given frame of speech based on information about two neighboring frames of speech.

7. The method of claim 4 wherein a boundary probability is assigned to a given frame of speech based on information about one or more speech frames preceding the given frame of speech and one or more speech frames subsequent to the given frame of speech.

8. The method of claim 1 wherein boundary probabilities are assigned by an artificial neural network (ANN).

9. The method of claim 8 further comprising the step of training said ANN based on only selected portions of continuous training speech likely to include boundaries between acoustic events.

10. The method of claim 9 wherein the ANN is trained based only on selected portions of continuous training speech likely to involve boundaries between phonemes.

11. The method of claim 10 wherein relatively few frames from the middle of phonemes are used to train the ANN.

12. The method of claim 1 further comprising the step of changing a boundary probability assigned to a given frame of speech based on a boundary probability assigned to at least one neighboring frame of speech.

13. The method of claim 12 wherein the boundary probability assigned to said respective frame of speech is changed based on boundary probabilities assigned to one or more speech frames preceding said respective frame of speech and based on boundary probabilities assigned to one or more speech frames subsequent to said respective frame of speech.

14. The method of claim 12 wherein an ANN determines the amount by which the boundary probability assigned to said given frame of speech is changed.

15. The method of claim 1 wherein said word sequences are generated based on frames of speech assigned boundary probabilities greater than a preselected threshold value.

16. The method of claim 15 wherein the step of using selected boundary frames further comprises the step of preventing generation of certain word sequences based on speech frames assigned boundary probabilities greater than a second preselected threshold value that is greater than the first preselected threshold value.

17. The method of claim 15 further comprising the step of respectively assigning to stored word models probabilities of match representative of the degree to which speech segments between selected boundary frames correspond to said stored word models.

18. The method of claim 1 wherein the received sequence of frames of speech is generated from continuous speech.

19. The method of claim 1 wherein a score is assigned to each generated sequence based at least in part on the boundary probabilities assigned to the selected boundary frames.

20. The method of claim 1 wherein the plurality of word sequences are generated by generating sequences of one or more speech segments separated by selected boundary frames, with each speech segment comprising a plurality of frames, and by assigning segment probabilities to stored sub-word models based on the degree to which a given stored sub-word model corresponds to a generated speech segment.

21. The method of claim 20 further comprising the step of assigning probabilities to stored word models based on probabilities assigned to the stored sub-word models.

22. The method of claim 20 wherein the stored sub-word models correspond to a selected set of phonemes.

23. A speech recognizer for recognizing speech from a received signal representing a spoken sequence of one or more words comprising a boundary classifier having an input adapted to receive a sequence of frames of acoustic events separated by boundaries, said boundary classifier being adapted to assign to received frames respective boundary probabilities representative of the degree to which the frames of speech correspond to stored representations of boundaries between acoustic events and to select boundary frames based on the boundary probabilities assigned to the frames, a network generator using boundary frames selected by said boundary classifier to generate sequences of one or more words between a first selected boundary frame and a subsequent selected boundary frame, wherein multiple words in any given sequence are separated by one or more selected boundary frames, a sequence classifier assigning a score to each generated sequence, and a processor adapted to provide an output corresponding to recognized speech using the sequence of one or more words with the highest assigned score.

24. The speech recognizer of claim 23 further comprising a signal processor having an input for receiving a speech signal representing a spoken sequence of one or more words, said signal processor adapted to process said speech signal into a sequence of overlapping frames, said signal processor further having an output coupled to the input of said boundary classifier and adapted to pass frames of said sequence of frames to said boundary classifier at a fixed rate.

25. The speech recognizer of claim 24 wherein said signal processor passes each of said overlapping frames to said boundary classifier.

26. The speech recognizer of claim 23 wherein said boundary classifier assigns a boundary probability to a given frame of speech based on information about one or more neighboring frames of speech.

27. The speech recognizer of claim 26 wherein said boundary classifier assigns a boundary probability to a given frame of speech using information about one or more speech frames preceding said given frame of speech and one or more speech frames subsequent to said given frame of speech.

28. (Amended) The speech recognizer of claim 23 wherein said boundary classifier comprises an ANN for assigning boundary probabilities to received frames of speech.

29. The speech recognizer of claim 28 wherein said ANN is trained based on only selected portions of continuous training speech likely to involve boundaries between acoustic events.

30. The speech recognizer of claim 23 wherein said boundary classifier further comprises a peak-picker for changing the boundary probability assigned to a respective frame of speech based on a boundary probability assigned to at least one neighboring frame of speech.

31. The speech recognizer of claim 30 wherein said peak-picker changes the boundary probability assigned to said respective frame of speech based on boundary probabilities assigned to one or more speech frames preceding said respective frame of speech and based on the boundary probabilities assigned to one or more frames of speech subsequent to said respective frame of speech.

32. The speech recognizer of claim 31 wherein said peak-picker comprises an ANN.

33. The recognizer of claim 23 wherein said network generator generates word sequences based on speech frames assigned boundary probabilities above a threshold value.

34. The speech recognizer of claim 23 wherein the sequence classifier assigns a score to each generated sequence based at least in part on the boundary probabilities assigned to the selected boundary frames.

* * * * *

UNITED STATES PATENT AND TRADEMARK OFFICE
CERTIFICATE OF CORRECTION

PATENT NO. : 5,638,487
DATED : June 10, 1997
INVENTOR(S) : Benjamin Chigier

It is certified that error appears in the above-identified patent and that said Letters Patent is hereby corrected as shown below:

Col. 10, line 20, "260≃269" should be --260-269--.

Col. 14, line 4, delete "(Amended)".

Signed and Sealed this

Eleventh Day of November, 1997

Attest:

BRUCE LEHMAN

*Attesting Officer*          *Commissioner of Patents and Trademarks*